F. F. HASE.

FLOOR SCRAPER.

APPLICATION FILED MAY 31, 1907.

Reissued Aug. 17, 1909.

13,011.

Witnesses.
Edward T. Wray.
Abbi E. Johnson.

Inventor.
Frank F. Hase.
by Parker & Carter
Attorneys.

ANDREW B. GRAHAM CO., PHOTO-LITHOGRAPHERS, WASHINGTON, D. C.

UNITED STATES PATENT OFFICE.

FRANK F. HASE, OF MILWAUKEE, WISCONSIN.

FLOOR-SCRAPER.

No. 13,011. Specification of Reissued Letters Patent. Reissued Aug. 17, 1909.

Original No. 839,994, dated January 1, 1907, Serial No. 331,839. Application for reissue filed May 31, 1907. Serial No. 377,283.

*To all whom it may concern:*

Be it known that I, FRANK F. HASE, a citizen of the United States, residing at Milwaukee, in the county of Milwaukee and State of Wisconsin, have invented certain new and useful Improvements in Floor-Scrapers, of which the following is a full, clear, and exact specification.

My invention refers to floor-scrapers, and consists in certain peculiarities of construction and combination of parts, as fully set forth hereinafter with reference to the accompanying drawings and subsequently claimed, its object being to provide a simple and effective floor-scraper so arranged as to be capable of manipulation with ease by unskilled labor.

Figure 1:
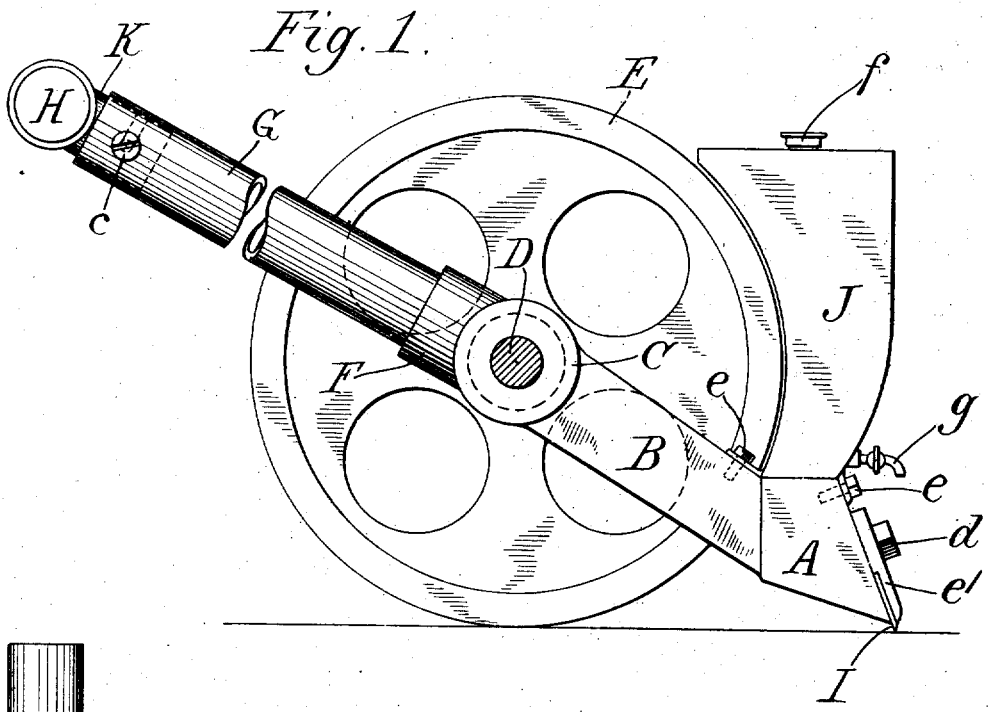
Figure 2:
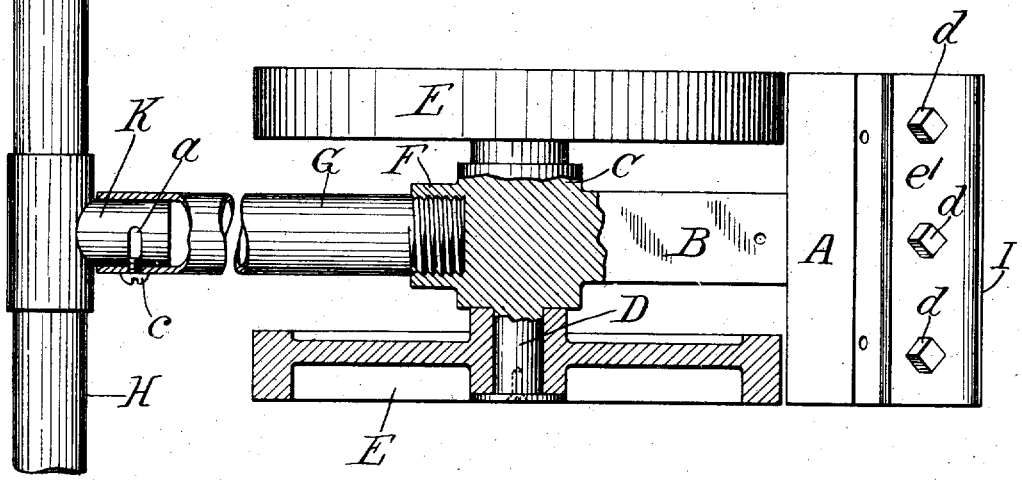

In the drawings, Figure 1 is a side elevation of a floor-scraper embodying the features of my invention, one of the wheels being shown removed, the axle in section; and Fig. 2, a plan view of the same with portions broken away and portions in section to better illustrate the details, the variable-weight tank being removed.

Referring by letter to the drawings, A indicates a solid metal scraper-head and B a neck thereof, said neck terminating in a bearing-hub C, from which projects a stud-axle D, that has loosely mounted thereon a pair of wheels E for the support of the scraper.

A shank F extends rearward of the bearing-hub C, into which is threaded a stem G, that is preferably formed from a pipe section. The end of the stem is open to receive a T-coupling K, the center boss of which enters the stem, having a semicircular slot *a* for the reception of a locking screw *c*, which serves to hold said T in place and at the same time permits the latter to swivel. The cross of the T has secured therein a handle-bar H, provided for convenience of the operator in manipulating the device when the latter is to be used adjacent a wall or the like. By reason of the swivel connection of its handle bar the said bar may be turned at a right angle to the position as shown in the drawings in order to permit said machine to work directly adjacent to said wall.

A blade I is secured to the front inclined surface of the scraper-head by means of a place *e'* and bolts *d*, the latter drawing the plate firmly down upon the blade, and thereby securely holding the same in its adjusted position, said blade being capable of quick removal for grinding or replacing.

The weight of the scraper-head and its parts is such as would be ordinarily used for delicate work, and in order to add to the same a tank J is secured to the head by means of lugs and bolts *e*, the tank being provided with a filling opening and cap *f* and a drain-cock *g* at the bottom thereof. The tank is designed to receive water, sand or other shifting weighty material that can be readily drawn off or added to in order to get the exact weight required to produce pressure upon the scraper for various kinds of work, and when the device is not in use the surplus weight thus obtained may be drawn off to reduce said weight, thereby rendering the scraper lighter for transportation and reducing the cost of manufacture, as well as shipment charges.

In operating the machine it is only necessary to permit the blade by gravity to rest upon the work and draw the same in a direction corresponding to the incline of said blade, and when the latter is at the end of its stroke press the handle down, so that the scraper-head will clear the floor or other article being scraped, the direction of the device being then reversed for another cut, and so on. The weight is, therefore, adjustable to practically any desired amount between any two predetermined limits. The volume of water, sand or other material in, and thus forming an effective part of the weight, can, of course, be varied from the smallest to the largest amount which the tank or receptacle is capable of holding. The weight is placed as nearly as possible directly above the blade, thus giving the blade or knife the least possible chance to vibrate. Vibration is an inherent difficulty in many of such floor scrapers. It is minimized or obviated by thus placing a relatively heavy weight immediately over the blade. This same result is also greatly facilitated by having the blade near to the point of support, and since it is necessary to have rollers or wheels on which the device is supported, the weight is placed directly in front of these wheels and above the knife. The apparatus is, of course, designed to work close up to the side of the wall or base-board and this is made possible by bringing the main wheels close together and placing the knife and weight in front of the wheels. If now the wheels are not associated with any laterally projecting securing part it is evident that the machine can be operated in the closest possible proximity to the side or baseboard without adjusting or moving any of the parts. The weight when so disposed becomes a fender or guard for the wheels. The length of the knife is exactly equal to the distance between the outside edges of the rims of the wheels.

When I speak of the weight, I refer, of course, to the entire weight composed of the head A and weight J, though the head A serves also as a support for the knife. The knife support and weight or weight receptacle could be made all of one piece. When I use the term "weight" I wish it to be understood in its broad sense as being separate from or a part of the support.

I claim:

1. A floor-scraper comprising a blade-head having a rearward neck, supporting wheels mounted upon the neck at either side thereof, a stem projecting from said neck, and a tank secured to the blade-head, whereby water or other shifting weighty material is retained.

2. A floor scraper comprising supporting wheels, a knife support pivotally carried thereby and forwardly projecting therefrom, a rearwardly projecting handle connected with such support, and a weight in front of such wheels on such support over the knife the weight and knife being as long as the distance between the outer sides of such wheels.

3. A floor scraper comprising supporting wheels, a knife support pivotally carried thereby and forwardly projecting therefrom, a rearwardly projecting handle connected with such support, and a weight in front of such wheels on such support over the knife in part curved so as to conform to the outline of such wheels and placed in close proximity to their forward portions.

FRANK F. HASE.

Witnesses:
D. K. Courtenay,
Monthey Haug.